United States Patent [19]
Sturtevant

[11] 3,936,888
[45] Feb. 10, 1976

[54] EFFLUENT DISPOSAL SYSTEM

[76] Inventor: Paul A. Sturtevant, 3880 W. Riverside Drive, Fort Myers, Fla. 33901

[22] Filed: June 19, 1974

[21] Appl. No.: 480,836

[52] U.S. Cl. .......................... 4/10; 4/114; 4/131; 210/152
[51] Int. Cl.² ........................................ E03D 11/02
[58] Field of Search ............... 4/10, 114, 118, 131; 210/152, 173, 180, 181

[56] References Cited
UNITED STATES PATENTS

| | | | |
|---|---|---|---|
| 3,504,797 | 4/1970 | Reid | 210/152 |
| 3,586,170 | 6/1971 | Reid | 210/152 X |
| 3,597,769 | 8/1971 | Brainard et al. | 4/10 |
| 3,633,746 | 1/1972 | Dieterich | 210/152 X |
| 3,635,276 | 1/1972 | Green et al. | 210/152 X |
| 3,775,978 | 12/1973 | Body | 4/131 X |
| 3,833,943 | 9/1974 | Sturtevant | 4/10 |

Primary Examiner—Richard E. Aegerter
Assistant Examiner—Charles E. Phillips
Attorney, Agent, or Firm—Malin & Haley

[57] ABSTRACT

An effluent disposal system for use in conjunction with a high temperature heat source in which waste material is macerate and meterably discharged into the source of heat as a function of heat source operating conditions such as pressure or temperature, thus insuring the most efficient waste disposal throughout the complete heat source operating range. When utilized with an internal combustion engine, the overall system efficiency is increased by obtaining engine operating information from the intake manifold with a sensing means which measures the vacuum or pressure within a particular portion of the intake manifold and uses the intake manifold information as an input to the metering device. Thus, Applicant's device determines the heat source output of an internal combustion engine and relates the engine condition to a metering device for discharging the effluent, thus insuring that the amount of effluent metered into the engine exhaust stream is a function of the engine output. Additionally the effluent discharge line may be placed and housed within the exhaust manifold itself, with the effluent discharge line being constructed of a thermally conductive material to provide effluent discharge into the exhaust line at the maximum heat source, thus insuring the most thorough calcination and sterilization of the effluent.

1 Claim, 4 Drawing Figures 3,936,888

EFFLUENT DISPOSAL SYSTEM

BACKGROUND OF THE INVENTION

This invention relates generally to a waste disposal system utilizing a source of intense heat for efficient waste eradication and removal, sterilization and calcination. It is specifically intended for use on vehicles such as mobile homes, mobile travel trailers, boats, motor coaches, aircraft, and the like. Up to the present, waste disposal systems have been utilized in which a constant volume of effluent is discharged directly into an internal combustion engine exhaust stream regardless of the engine operating level. The maximum amount of effluent that may be sterilized and calcinated is dependent upon the temperature of the heat source and the flow volume of the exhaust. The exhaust temperature (and pressure) of an internal combustion engine varies with engine power output. With a constant volume effluent flow disposal system, the correct amount of effluent for most efficient treatment is not received by a variable heat source such as an internal combustion engine operating in a wide power range. In another system, a control device has been utilized which initiates the waste flow at a predetermined threshold value of vehicle speed, again disregarding engine operating conditions. No system provides for complete and efficient waste disposal operable as a function of the heat source condition.

Applicant has provided an improved effluent disposal system in U.S. patent appplication Ser. No. 270,076 now U.S. Pat. No. 3,833,943, issued Sept. 10, 1974, entitled "DISPOSAL SYSTEM UTILIZED WITH A HEAT SOURCE" which operates the effluent metering into the exhaust line as a function of exhaust line parameters. Applicant has found as an improvement that when the effluent discharge meter control means is connected to and receives an input determinative of the amount of vacuum or reduced pressure in the intake manifold, the intake manifold pressure provides a more sensitive and responsive engine operating parameter of the instantaneous operating condition of the engine to provide an operating parameter which controls the metering of effluent ejected into the internal combustion exhaust system for calcination and sterilization. The metering device may include a pressure sensitive diaphram in which, when the vacuum in the intake manifold is at a maximum, the output of the effluent disposal system into the manifold exhaust will be a maximum. For additional thoroughness of calcination and sterilization, the effluent outlet into the exhaust system is provided and housed within the effluent manifold chamber and is constructed of a thermally conductive material. This insures and provides that the exhaust gases of the internal combustion engine contact the effluent discharge at exhaust gas maximum output temperature.

It is an object of this invention to provide an improved effluent waste disposal system.

It is another object of this invention to provide a disposal system for use in a mobile environment such as travel trailers, boats, motor homes, and the like which utilize an internal combustion engine.

And yet another object of this invention is to provide an effluent disposal system in which the volume flow of macerate effluent into the heat source is meterably controlled as a function of maximum heat source disposal capacity.

And yet still another object of this invention is to provide a vehicle waste disposal system coupled to the exhaust line of the vehicle in which the optimum amount of effluent is discharged into the exhaust line for disposal into the atmosphere as a function of the exhaust gas temperature and flow volume availability.

And yet another object of this invention is to provide an effluent disposal system utilized in conjunction with an internal combustion engine in which the reduced pressure or vacuum formed in the intake manifold is utilized as a sensing signal to the effluent metering device to provide a volume of effluent discharge into the exhaust manifold line as a function of engine operating condition.

In accordance with these and other objects which will be apparent hereinafter, the instant invention will now be described with particular reference to the accompanying drawings.

PREFERRED EMBODIMENT OF THE INVENTION

Figure 1:
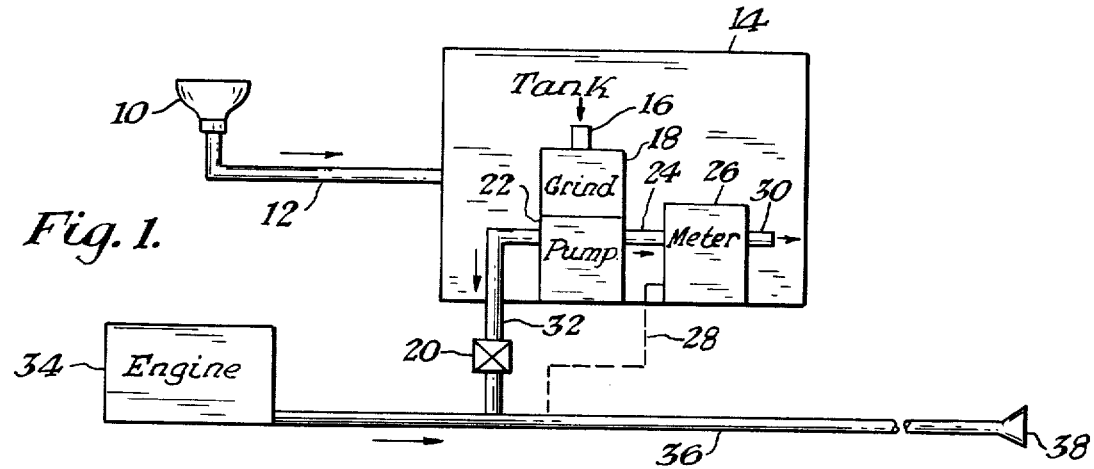
FIG. 1 is a schematic diagram of Applicant's invention.

Referring now to the drawings, especially FIG. 1, Applicant's invention is shown schematically having a regular toilet 10 coupled by conduit 12 to the effluent storage tank 14. Coupled to the tank 14 by conduit 16 is an effluent grinder 18 the output being connected to the input of positive pump 22. Macerate effluent is pumped through conduit 24 into a metering valve 26 with output 30 emptying in the tank 14. The metering valve 26 includes a sensing device attached to the exhaust line 36 by coupling 28 which may either be electrical or mechanical. Exhaust line 36 begins at combustion engine 34 and exits into the atmosphere at flanged end portion 38. The pump 22 is also coupled to the exhaust line 36 by conduit 32. A one-way check valve 20 prevents exhaust gases in exhaust line 36 from entering the pump 22. The meter 26 controls the pressure head in the pump 22 such that when the valve is open macerate effluent passes from the pump through the meter 26 and back into the tank reservoir. When the meter valve is in any other position than full open, pressure will increase in the pump output chamber (as a function of valve position) forcing macerate effluent through conduit 22 into exhaust line 36 where it is sterilized and calcinated. The sensor 28 determines the condition of the exhaust pressure or temperature in exhaust line 36 and adjusts the meter valve 26 to provide the proper amount of flow of effluent through return conduit 30. When the meter valve is closed, all the macerate effluent flows into the exhaust line 36.

The intense heat of the exhaust gases sterilizes and calcinates the macerate particles, reducing them to a harmless, fine powder that is discharged into the atmosphere.

Figure 2:
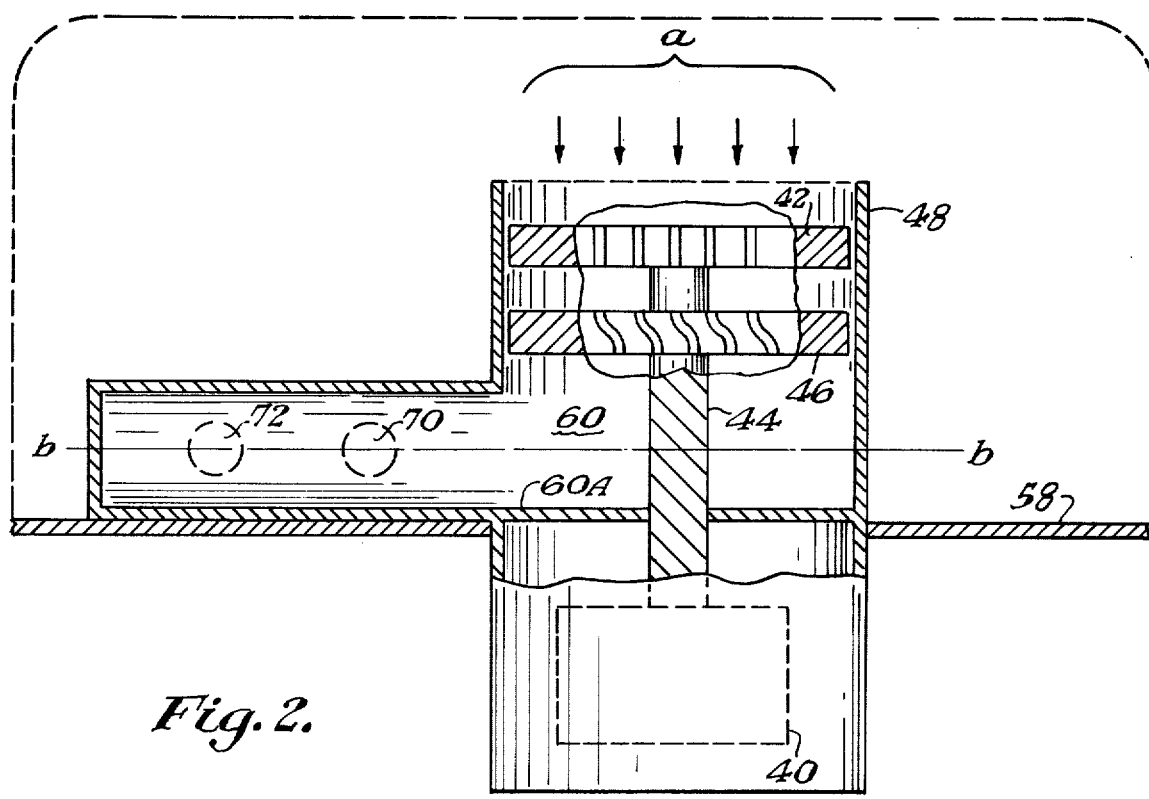
FIG. 2 shows the particular embodiment of Applicant's invention in partial vertical cross-section.

The preferred embodiment, including the sensing and metering devices, is shown in FIG. 2. Cylindrical housing 48 contains a grinder 42 connected by shaft 44 to pump blade 46, all being coupled to a motor 40 (dotted). The open end of housing 48 (arrow *a* showing flow) is submerged inside the tank 58. The housing 48 is shown having a first portion contained inside tank 58 with the remainder being located outside tank 58 with an appropriate seal (not shown) to prevent leakage between the housing 48 and the aperture in the tank 58. Fluid inside chamber 60 is prevented from reaching motor 40 by chamber wall 60A.

The circular grinder 42 has a plurality of teeth spaced about its circumference. Effluent is drawn to the circumference of the grinding blade by pressure created by the pump 46, where the rotational action of the grinding blade macerate the effluent. Rotating pump 46 draws the macerate effluent into chamber 60.

Figure 3:
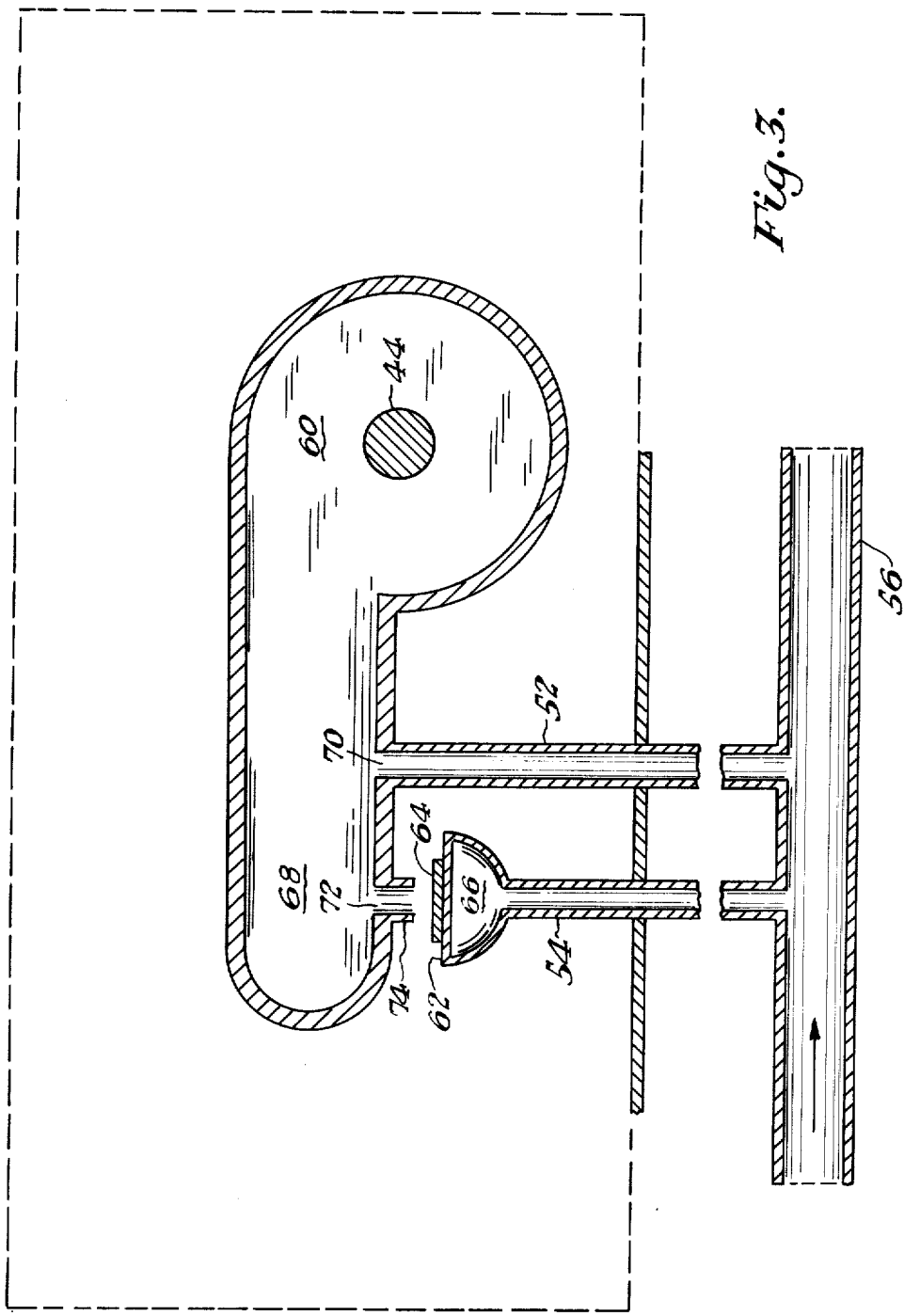
FIG. 3 shows the practical embodiment of Applicant's invention in horizontal cross-section through line b—b of FIG. 2.

FIG. 3 shows chamber 60, where the macerate effluent is discharged by the pump and continues into chamber 68 under pressure. The effluent may then be discharged through one of two openings in the housing, namely exhaust line discharge opening 70 or tank return opening 72, dependent upon the position of diaphragm 62 and valve 64. Exhaust gas pressure from an internal combustion engine in the exhaust pipe 56 communicates through conduit 54 into diaphragm chamber 66, where it acts upon the elastic diaphragm 62. If the force on valve 64 from the exhaust pressure in chamber 66 is greater than the surrounding forces from fluid pressure within tank 58 and fluid pressure of effluent exiting through exhaust 72, the diaphragm 62 will be forced toward the tank return opening 72. As the valve plate 64 gets closer to the tank return conduit 74, pressure within chamber 68 on the effluent will increase. As the effluent pressure increases in chamber 68, effluent pressure is greater than exhaust pressure in conduit 52, and effluent will begin flowing out through conduit 52. The amount of effluent flowing through the conduit 52 will be a function of and is determined by the position of valve plate 64 in relation to the tank return opening across conduit 74. When the engine is at idle (lowest power output) the diaphragm 62 and valve plate 64 will be farthest from closing conduit 74 which thereby permits minimum flow of effluent out through conduit 74 back into the tank. Because of the exhaust pressure in conduit 52, minimum effluent will flow out into the exhaust line. The diaphragm 62 being responsive to the engine exhaust pressure and therefore regulating the return flow of effluent back into the tank will thus meterably regulate the amount of effluent flowing through conduit 52 into the exhaust line 56. Thus the power output which controls exhaust pressure will thus be used to properly meter the correct amount of effluent into the exhaust stream that can be reasonably calcinated. In order for effluent to flow into conduit 52, the exhaust pressure in conduit 52 must be overcome by a larger pressure created in chamber 68, caused by closing valve 64. This insures maximum efficiency of operation regardless of the power setting of the vehicle. For example, a vehicle in low gear going up a hill at a high power output setting, although at low vehicle speed, would be able to utilize the maximum tank output, while conversely, proceeding downhill at lower power setting, only a small amount of effluent will be discharged into the exhaust line. It is especially important in view of pollution requirements that excessive amounts of effluent are not discharged into the exhaust stream when it is not capable of calcinating the macerate effluent.

Returning to FIG. 2, openings 72 and 70, return line and effluent output respectively are shown protruding through tank housing 58. A proper seal is provided about each conduit through the tank to insure that the tank does not leak.

In operation, the pump 46 may be turned on at anytime that the vehicle motor is running. The diaphragm size, and therefore the pressure necessary to move the valve plate 64 is chosen sufficiently large to provide pressure above atmospheric thereby insuring the proper quantity of effluent for a particular power setting. If, for example, (FIG. 3) the exhaust pressure in conduit 52 and across effluent discharge opening 70 were one pound, then for effluent to be discharged out the opening 70, the pressure head in chamber 68 (above one pound) would have to be determined and provided by proper location of the diaphragm and valve plate 64 across the return opening 72. The pump output in volume flow remains constant at all times during operation.

The exact or particular amounts will be a function of the size of the pump, the conduits and other factors which will determine the pump mixture and ratio between effluent discharge and the vehicle engine exhaust.

Although shown as a pressure sensitive diaphragm, the sensing device could be replaced by a thermostatic control device that would open and close the valve 64 as a function of the temperature of the exhaust.

Overall system efficiency is also increased through the re-macerate of effluent that is returned to the tank when the heat source is not at maximum.

Figure 4:
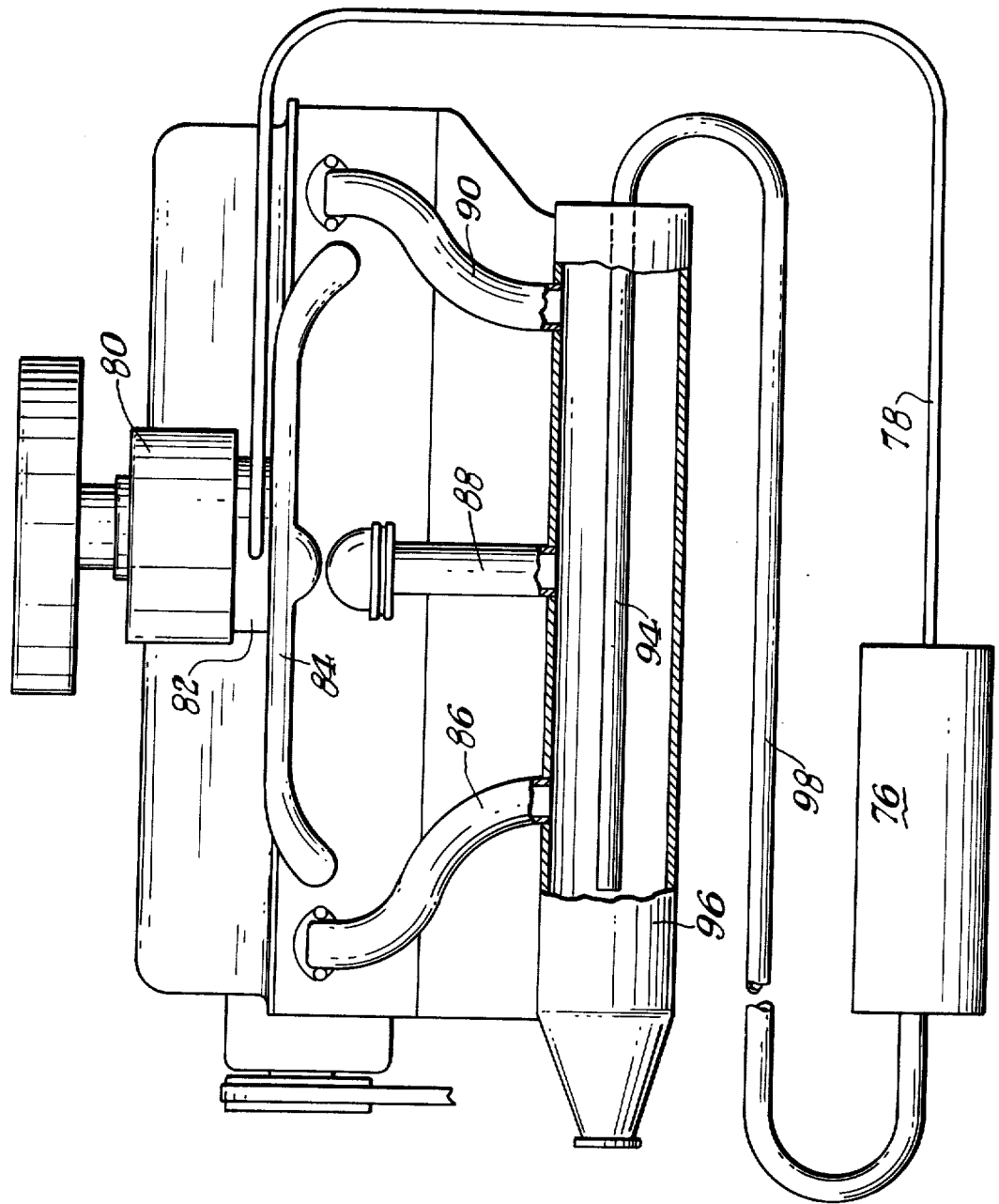
FIG. 4 shows Applicant's improved device connected to a typical internal combustion engine with part of the exhaust manifold cut-away in a side elevational view.

FIG. 4 shows an improved embodiment of Applicant's invention in which the effluent receiving tank 76 is connected by conduit 78 into a conventional internal combustion engine intake manifold 84 which is connected to the carburetor 80 by the intake manifold mixing chamber 82 wherein the fuel and air is mixed and sucked into the combustion chambers through the intake manifold 84. A reduced pressure (or vacuum) which is a function of engine load output is formed in mixing chamber 82. The output of the effluent disposal pump within tank 76, similar to that described above, is connected by conduit 98 into the effluent exhaust conduit 94 which is constructed of a thermally conductive material such that the exhaust end of the effluent output is disposed within the internal combustion engine exhaust manifold 96 in fluid communication with an exhaust pipe (not shown) connected at 92. The effluent outlet line 94 is longitudinally disposed within the exhaust manifold. Thus, the effluent discharge flowing through the elongated portion of thermally conductive conduit 94 disposed within the exhaust manifold chamber provides preheating of the effluent to calcinize and sterilize the effluent as it travels along the conduit adjacent and within the maximum heating area of the engine exhaust. The metering system shown in the embodiment of FIG. 4 may be similar in function as that shown in FIG. 3 except that the metering sensing device which controls the output of the effluent chamber into the exhaust system will be constructed to function such that as the vacuum is increased in the mixing chamber 82 of the intake manifold 84, the output of the metered effluent will increase so that when the engine is operating at its maximum capacity (having a maximum vacuum in the mixing chamber) the effluent disposal system will be providing a maximum output of effluent into the exhaust line system. Of course in principle, any vacuum sensitive device may be utilized to control or actuate and regulate the amount of metering with regard to the effluent output.

The particular or exact location of the open end of effluent disposal outlet conduit 94 is not specifically critical to the operation of the invention but it is desirous that the conduit 94 extend along and adjacent to the openings of typical exhaust conduits 86, 88 and 90 as shown in this example. Thus, prior to the effluent being ejected from the open end of conduit 94, as the effluent travels throughout the length of the thermally conductive conduit 94, which may be made of steel or the like, the effluent will be heated to improve the sterilization and calcination of the effluent as it is deposited into the exhaust system itself where it is discharged with the exhaust gases through exhaust pipe connection 92. The operation of the carburetor, intake manifold system, and exhaust manifold system are conventional and Applicant's device may be adapted to any type of conventional internal combustion engine system.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An effluent waste disposal system utilized in combination with a conventional internal combustion engine having an exhaust manifold communicating with said engine by exhaust conduits an exhaust pipe connected to said manifold, an intake manifold, a carburetor, a mixing chamber disposed between said intake manifold and said carburetor, comprising:

effluent collection tank, said tank having an input and an output;

means connected to said tank for macerating said effluent within said tank;

a pressure sensing means having an input and an output, said input connected to said mixing chamber of said internal combustion engine;

effluent flow, pressure activated metering means connected to the output of said collection tank for regulating the quantitative volume flow of effluent from said tank as a function of pressure, the output of said pressure sensing means connected to said metering means; and a thermally conductive effluent discharge conduit disposed within said exhaust manifold in the direction of the longitudinal axis of said exhaust manifold, positioned adjacent the exhaust conduits of said engine and having a discharge opening within said exhaust manifold, the input of said discharge conduit connected to the output of said effluent flow metering means whereby the meter flow discharge volume varies as a function of the pressure of said mixing chamber such that the maximum volume output of said effluent tank is achieved at the lowest absolute pressure in said mixing chamber.

* * * * *